US010536557B2

(12) United States Patent
Raghavan et al.

(10) Patent No.: US 10,536,557 B2
(45) Date of Patent: Jan. 14, 2020

(54) METHOD, APPARATUS, AND COMPUTER PROGRAM PRODUCT FOR IMPLEMENTING CUSTOMIZABLE CACHING STRATEGY BASED ON TRAFFIC PATTERN TO OPTIMIZE MEMORY FOOTPRINT AND REDUCE LATENCY (71) Applicant: HERE Global B.V., Eindhoven (NL)

(72) Inventors: Gopalakrishna Raghavan, Burlington, MA (US); Kalyan Kotamarthi, Burlington, MA (US)

(73) Assignee: HERE Global B.V., Eindhoven (NL)

( * ) Notice: Subject to any disclaimer, the term of this patent is extended or adjusted under 35 U.S.C. 154(b) by 32 days.

(21) Appl. No.: 15/178,752

(22) Filed: Jun. 10, 2016

(65) Prior Publication Data
US 2017/0359401 A1 Dec. 14, 2017

(51) Int. Cl.
H04L 29/08 (2006.01)
H04L 29/06 (2006.01)
G06F 21/30 (2013.01)

(52) U.S. Cl.
CPC .......... H04L 67/34 (2013.01); H04L 63/0876 (2013.01); H04L 63/102 (2013.01); H04L 67/2842 (2013.01)

(58) Field of Classification Search
CPC ....... H04L 67/02; H04L 63/08; H04L 63/102; H04L 67/2842; H04L 67/34; H04L 67/42; H04L 67/2847; G05B 2219/31239; G06F 8/4442; H04N 21/2183
See application file for complete search history.

(56) References Cited

U.S. PATENT DOCUMENTS

| 7,114,180 | B1 * | 9/2006 | DeCaprio | G06F 21/31 709/219 |
| 7,437,754 | B2 * | 10/2008 | Desai | H04L 63/101 709/229 |
| 9,673,998 | B2 * | 6/2017 | Li | H04L 47/783 |
| 9,727,577 | B2 * | 8/2017 | Vongsouvanh | G06F 17/30194 |
| 2002/0112083 | A1 * | 8/2002 | Joshi | G06F 17/30876 709/248 |
| 2002/0112155 | A1 * | 8/2002 | Martherus | G06F 21/41 713/155 |

(Continued)

OTHER PUBLICATIONS

"SDN Northbound REST API with Efficient Caches" Wei Zhou; Li Li; Wu Chou; 2014 IEEE International Conference on Web Services; Year: 2014; IEEE Conference Publications.*

Primary Examiner — Jung W Kim
Assistant Examiner — Sameera Wickramasuriya
(74) Attorney, Agent, or Firm — Alston & Bird LLP (57) ABSTRACT A method, apparatus, and computer program product are provided to implement a customized caching strategy which optimizes the implementation based on usage patterns. In the context of a method a client request for a service is intercepted and an authentication check is performed for the client request based on cached data. In an instance in which the authentication check succeeds, the method performs an authorization check for the client request based on the cached data. In an instance in which the authorization check succeeds, the method forwards the client request for the service to the service. A corresponding apparatus and a computer program product are also provided.

17 Claims, 8 Drawing Sheets (56) References Cited

U.S. PATENT DOCUMENTS

| | | | | |
|---|---|---|---|---|
| 2002/0143943 A1* | 10/2002 | Lee | G06F 21/41 | 709/225 |
| 2002/0165911 A1* | 11/2002 | Gabber | G06F 16/10 | 709/203 |
| 2003/0196114 A1* | 10/2003 | Brew | G06F 21/10 | 726/1 |
| 2011/0184993 A1* | 7/2011 | Chawla | G06F 9/45533 | 707/802 |
| 2011/0314526 A1* | 12/2011 | Valentine | G06F 21/32 | 726/6 |
| 2012/0221774 A1* | 8/2012 | Atkisson | G06F 12/0802 | 711/103 |
| 2013/0275685 A1* | 10/2013 | Barbas | G06F 17/3048 | 711/137 |
| 2014/0006538 A1* | 1/2014 | Oikonomou | H04L 67/2847 | 709/213 |
| 2015/0134916 A1* | 5/2015 | Padalikar | G06F 12/0888 | 711/138 |
| 2015/0229638 A1* | 8/2015 | Loo | H04L 63/029 | 726/9 |

* cited by examiner

METHOD, APPARATUS, AND COMPUTER PROGRAM PRODUCT FOR IMPLEMENTING CUSTOMIZABLE CACHING STRATEGY BASED ON TRAFFIC PATTERN TO OPTIMIZE MEMORY FOOTPRINT AND REDUCE LATENCY

TECHNOLOGICAL FIELD

An example embodiment of the present invention relates generally to Application Program Interface management, and more specifically, to caching strategy.

BACKGROUND

Authentication and authorization of a Representational State Transfer (REST) Application Program Interface (API) endpoint is applied based on customer application meta-data and plan information. This information usually persists in a database that is external to the node that is hosting the web service. When requests are received by the web service, there is latency involved in fetching meta information to validate the incoming requests. This meta information can be cached to improve performance. However, the downside with such caching is that the cache memory footprint increases linearly with service subscription.

BRIEF SUMMARY

Methods, apparatuses, and computer program products are therefore provided according to example embodiments of the present invention to implement a customized caching strategy which optimizes the implementation based on usage patterns. Example embodiments provide a low latency and small memory footprint service to validate incoming requests against entitlements.

In one embodiment, a method is provided that at least includes intercepting, by a processor, a client request for a service, such as a client request for service by a Representational State Transfer (REST) Application Program Interface (API) endpoint. The method also includes performing an authentication check for the client request based on cached data. In an instance in which the authentication check succeeds, the method performs an authorization check for the client request based on the cached data. In addition, in an instance in which the authorization check succeeds, the method forwards the client request for the service to the service.

The method of an example embodiment also includes logging data associated with the client request. The method may also include retrieving metadata related to the client request based on the client request prior to performing the authentication check. In an example embodiment, the method further includes checking a cache for data relevant to the client request, retrieving metadata related to the client request based on the client request in an instance in which the data relevant to the client request is not found in the cache, and causing the retrieved metadata to be stored to the cache prior to performing the authentication check. The method of an example embodiment also includes clearing data from the cache based on a time-to-live parameter associated with the data.

In another embodiment, an apparatus, such as may be embodied by a Secure End Node (SEN), is provided that includes at least one processor and at least one memory including computer program instructions with the at least one memory and the computer program instructions, with the at least one processor, causing the apparatus at least to intercept a client request for a service, such as a client request for service by a Representational State Transfer (REST) Application Program Interface (API) endpoint. The at least one memory and the computer program instructions, with the at least one processor, also cause the apparatus to perform an authentication check for the client request based on cached data and, in an instance in which the authentication check succeeds, perform an authorization check for the client request based on the cached data. In an instance in which the authorization check succeeds, the at least one memory and the computer program instructions, with the at least one processor, further cause the apparatus to forward the client request for the service to the service.

The at least one memory and the computer program instructions, with the at least one processor, further cause the apparatus of an example embodiment to log data associated with the client request. The at least one memory and the computer program instructions, with the at least one processor, further cause the apparatus of an example embodiment to retrieve metadata related to the client request based on the client request prior to performing the authentication check. The at least one memory and the computer program instructions, with the at least one processor, further cause the apparatus of an example embodiment to check a cache for data relevant to the client request, retrieve metadata related to the client request based on the client request in an instance in which the data relevant to the client request is not found in the cache, and cause the retrieved metadata to be stored to the cache prior to performing the authentication check. The at least one memory and the computer program instructions, with the at least one processor, further cause the apparatus to clear data from the cache based on a time-to-live parameter associated with the data.

In a further example embodiment, a computer program product is provided that includes at least one non-transitory computer-readable storage medium bearing computer program instructions embodied therein for use with a computer with the computer program instructions including program instructions which, when executed, cause the computer at least to intercept a client request for a service, such as a client request for service by a Representational State Transfer (REST) Application Program Interface (API) endpoint. The computer program instructions also include program instructions which, when executed, cause the computer to perform an authentication check for the client request based on cached data and, in an instance in which the authentication check succeeds, perform an authorization check for the client request based on the cached data. In an instance in which the authorization check succeeds, the computer program instructions further include program instructions which, when executed, cause the computer to forward the client request for the service to the service.

The computer program instructions of an example embodiment further include program instructions which, when executed, cause the computer to log data associated with the client request. The computer program instructions may also include program instructions which, when executed, cause the computer to retrieve metadata related to the client request based on the client request prior to performing the authentication check. The computer program instructions of an example embodiment further include program instructions which, when executed, cause the computer to: check a cache for data relevant to the client request, retrieve metadata related to the client request based on the client request in an instance in which the data relevant to the client request is not found in the cache, and cause the retrieved metadata to be stored to the cache prior to performing the authentication check. In an example embodiment, the computer program instructions further include program instructions which, when executed, cause the computer to clear data from the cache based on a time-to-live parameter associated with the data.

In yet another example embodiment, an apparatus is provided that at least includes means for intercepting a client request for a service, such as a client request for service by a Representational State Transfer (REST) Application Program Interface (API) endpoint. The apparatus also includes means for performing an authentication check for the client request based on cached data. In an instance in which the authentication check succeeds, the apparatus further includes means for performing an authorization check for the client request based on the cached data. In addition, in an instance in which the authorization check succeeds, the apparatus includes means for forwarding the client request for the service to the service.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Methods, apparatuses, and computer program products are therefore provided according to example embodiments of the present invention to implement a customized caching strategy which optimizes the implementation based on usage patterns. Example embodiments provide a low latency and small memory footprint service to validate incoming requests against entitlements.

Authentication and authorization of a REST API endpoint is applied based on customer app meta-data and plan information. This information usually persists in a database that is external to the node that is hosting the web service. When requests land on web service, there is latency involved to fetch meta information to validate the incoming requests. This meta information can be cached to improve performance. However the downside with this is that cache memory footprint increases linearly with service subscription.

Clients (CLI) make requests to services (SRV) using REST APIs to access certain resources. API endpoints are monetizable components. Endpoints are associated with a plan and customers are issued credentials that have access only to APIs that belong to specific plans.

Only authenticated and authorized requests from clients are allowed to access the service. As part of authentication the customer credentials are validated. Subsequently, the authorization step ensures that the client is valid and is allowed to use the resource.

For convenience, in the figures and the following description, the entry point to a service where authentication and authorization are applied is referred to as a Secure End Node (SEN). The backend point where client data is stored is referred to as D1 and the backend point where product information is stored is referred to as D2. Both D1 and D2 are storage with front end REST API. In an example embodiment, D1 stores application related data and D2 stores plan related data.

Request authentication is latency sensitive and should be a minor fraction of the overall round trip response time. Based on the service, response times may vary between 7 ms to 900 ms. The latency budget for an authentication component is typically between 1 ms and 30 ms.

Embodiments of the present invention provide methods and apparatuses to dynamically cache D1 and D2 information at the SEN, based on the type of service and the request pattern. D1 and D2 may store a significant amount of data, all of which cannot be efficiently cached into the SEN. Embodiments of the present invention provide efficient mechanisms for determining the data that should be cached in the SEN and providing low latency services.

Embodiments of the present invention provide customizable caching strategies. The customizable caching strategies provide mechanisms to optimize the implementation based on usage patterns. For example, premium customers may get better service level agreement (SLA) as compared to free and/or basic customers.

Embodiments of the present invention provide scalable designs that make it possible to support a large number of customers with a manageable system cost.

Overview of System Architecture

Figure 1:
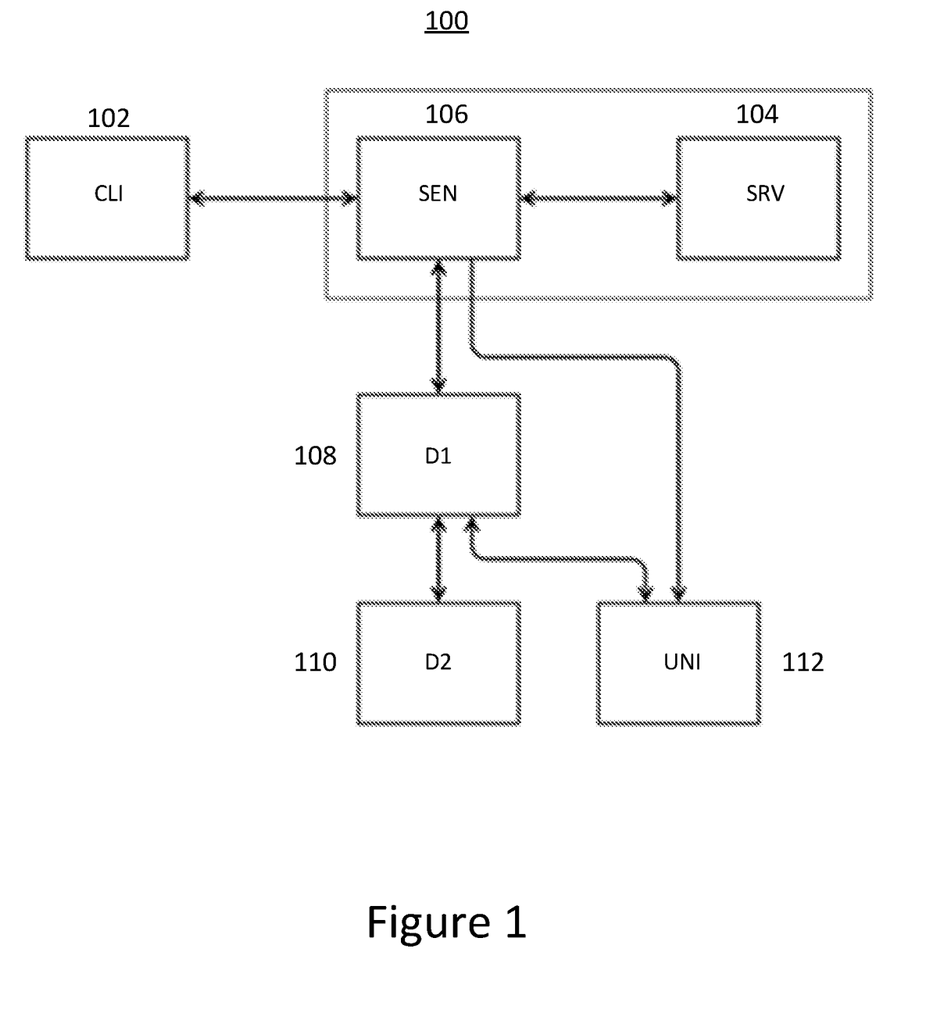
FIG. 1 illustrates an overview of an exemplary system architecture in accordance with an example embodiment of the present invention.

FIG. 1 provides an overview of exemplary system architecture 100 according to an example embodiment of the present invention. The CLI 102 requests access to a resource at SRV 104. The CLI request is intercepted at SEN 106 (SEN 106 is the first point of entry for the access request). SEN 106 uses information received from D1 108 and D2 110 to make authentication and authorization decisions in regard to the CLI request. In various embodiments, the CLI_META and PLAN_META might comprise any type of metadata as relevant to the client and/or the application. In at least some embodiments, D2 and/or the UNI (User Network Interface) may provide data to D1, which the DRI in turn may combine, if required, and provide to the SEN. For example, D2 may provide product data to the D1 which may then be included in the metadata to be provided to the SEN (e.g., to be cached in the SEN). In various embodiments, the amount of data stored (cached) in SEN 106 is dependent on data in UNI 112, and in some embodiments, additionally based on data in D2 110. In some embodiments, the SEN 106 pushes logs to the UNI 112. D1 108 may use data from UNI 112 to perform backend analytics. Based on the analytics, D1 108 may update various CLI meta information that may be used by SEN 106 to apply caching strategies, for example, most frequently visited, most frequently visited per service, or using other factors.

Overview of SEN Architecture

Figure 2:
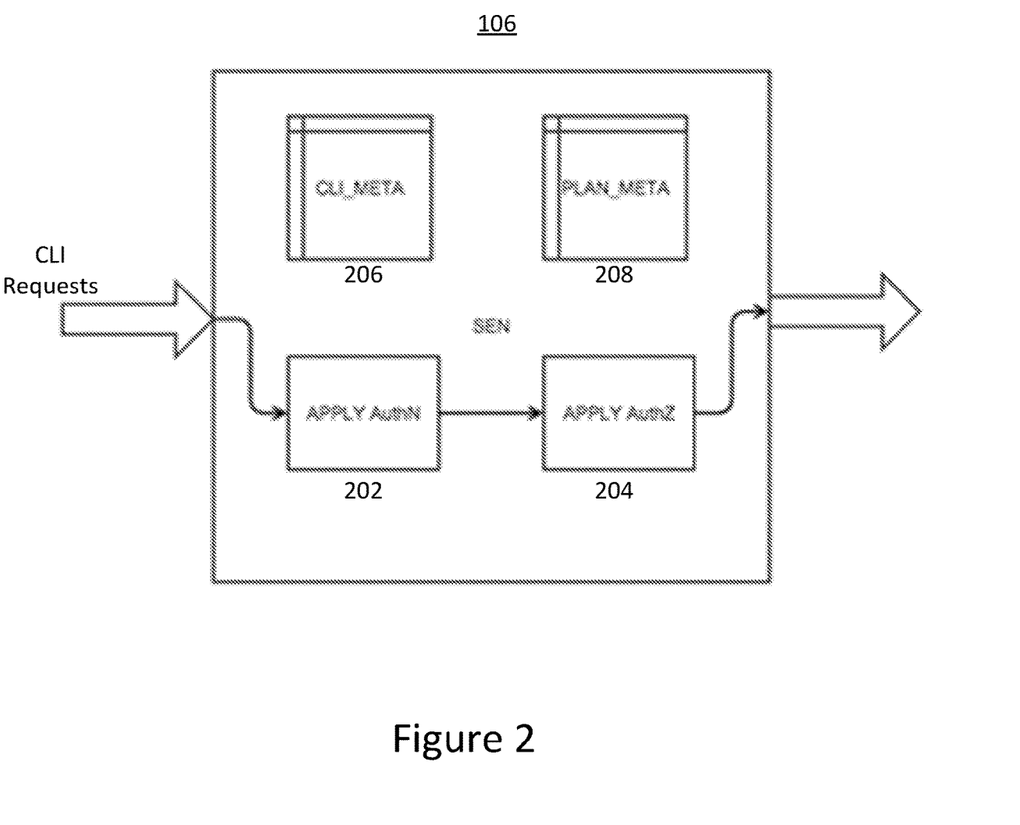
FIG. 2 illustrates an overview of an exemplary Secure End Node (SEN) architecture in accordance with an example embodiment of the present invention.

FIG. 2 provides an overview of exemplary SEN 106 architecture according to an example embodiment of the present invention. Requests from CLI 102 to SRV 104 are intercepted by SEN 106. SEN 106 performs various decision steps in regard to CLI requests. SEN 106 performs authentication decisions (AuthN 202) to CLI requests to validate the client credentials. SEN 106 performs authorization decisions (AuthZ 204) to ensure the client is allowed to use the requested resource(s). In making the authentication and authorization decisions, SEN 106 uses client metadata, CLI_META 206, and plan metadata, PLAN_META 208, retrieved from D1 108.

In various embodiments, there may be at least four approaches to how the CLI_META and PLAN_META information is retained at the SEN: On Demand, Sticky Cache, Replicate, and Smart Cache.

On Demand: The SEN retrieves only one CLI_META and PLAN_META from the D1 per CLI request, thus information is retrieved on demand. Every incoming CLI request will involve a sub-request to D1 for the information.

Sticky Cache: The SEN retrieves only one CLI_META and PLAN_META from the D1 per CLI request. However, the CLI_META and PLAN_META information is held in cache. Optionally, the CLI_META and PLAN_META information is evicted after a specified period, e.g., Time To Live (TTL).

Replicate: The SEN retrieves all CLI_META and PLAN_META information from the D1 for storage in SEN. The CLI_META and PLAN_META information in the SEN is periodically refreshed from D1.

Smart Cache: The SEN retrieves only CLI_META and PLAN_META that is defined and implemented by a strategy plugin. The strategy is configurable.

Smart Cache Strategy

In an example embodiment, the Smart Cache strategy for SEN caching is fully configurable, where the SEN can be configured to apply a specific strategy depending on specific goals.

In an example embodiment, the smart cache may be configured by using a 'type' setting that designates the strategy to be used. The following table provides some examples of different strategies that may be configured in an example embodiment.

| Type (byte) | Strategy |
| --- | --- |
| 00000000 | Most frequently visited |
| 00000001 | Most frequently visited per service |
| 00000010 | Most frequently visited per region |
| 00000011 | Most frequently visited per region per service |
| 00000100 | Premium CLI |

While these example caching strategies are described herein, embodiments of the present invention are not limited to these caching strategies. Some embodiments may provide for additional caching strategies.

Most frequently visited: Periodically calculates the most frequently visited CLI by running analytics on UNI data and updates D1. The SEN only retrieves this subset of CLI_META and PLAN_META.

Most frequently visited per service: Periodically calculates the most frequently visited CLI per service by running analytics on UNI data and updates D1. The SEN only retrieves this subset.

Most frequently visited per region: Periodically calculates the most frequently visited CLI per region by running analytics on UNI data and updates D1. The SEN only retrieves this subset.

Most frequently visited per region per service: Periodically calculates the most frequently visited CLI per service per region by running analytics on UNI data and updates D1. The SEN only retrieves this subset.

Premium CLI: Periodically, a process calculates the Premium CLI by running analytics on D1. The SEN only retrieves this subset.

In addition to configuring a 'type' for smart cache, a 'max threshold' value may be provided that specifies the maximum memory footprint of the cache. The smart cache strategy types can be extended and multiple strategies may be combined.

Figure 3:
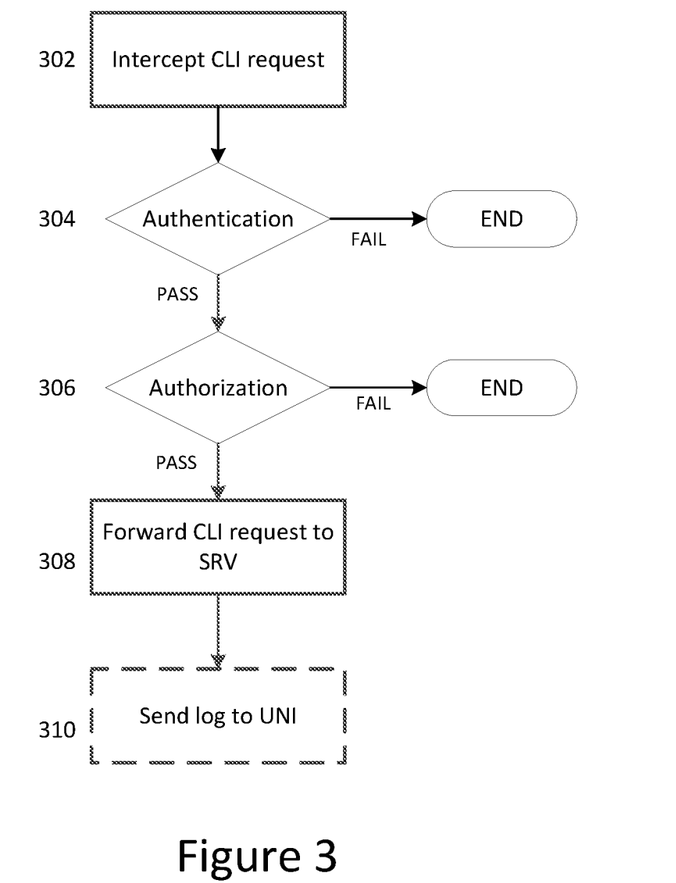
FIG. 3 provides a flow chart of example operations in accordance with an example embodiment of the present invention.

FIG. 3 provides a flow chart of example operations in accordance with an example embodiment of the present invention. At block 302, a CLI request to SRV is intercepted at the SEN, such as SEN 106, for example using means such as the processor 802, the memory 804, the communications interface 806, and/or the like. At block 304, the SEN makes an authentication decision in regard to the client credentials for the CLI request, for example using means such as the processor 802, the memory 804, and/or the like. If the client credentials are validated, the process continues to block 306. If the client credentials are not valid, the process ends.

At block 306, the SEN makes an authorization decision as to whether the client is authorized to access the requested resource, for example using means such as the processor 802, the memory 804, and/or the like. If the client is authorized to access the resource, the process continues to block 308. If the client is not authorized, the process ends.

At block 308, the SEN forwards the CLI request to the SRV, for example using means such as the processor 802, the memory 804, the communications interface 806, and/or the like. Optionally, at block 310, the SEN may send logs regarding the CLI requests to the UNI for use in analytics.

Figure 4:
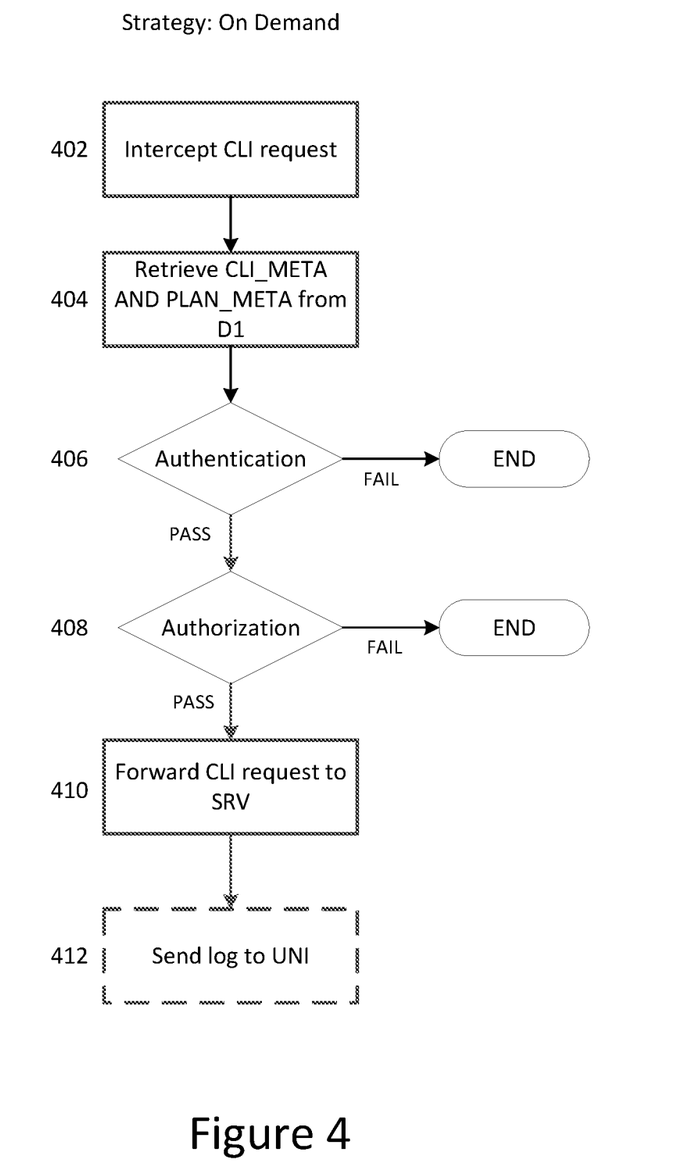
FIG. 4 provides a flow chart of example operations using an "on demand" approach to information retention by a SEN in accordance with an example embodiment of the present invention.

FIG. 4 provides a flow chart of example operations using an "on demand" approach to information retention by a SEN in accordance with an example embodiment of the present invention. At block 402, a CLI request to SRV is intercepted at the SEN, such as SEN 106, for example using means such as the processor 802, the memory 804, the communications interface 806, and/or the like. At block 404, the SEN retrieves CLI_META and PLAN_META metadata from D1.

At block 406, the SEN makes an authentication decision in regard to the client credentials for the CLI request, for example using means such as the processor 802, the memory 804, and/or the like. If the client credentials are validated, the process continues to block 408. If the client credentials are not valid, the process ends.

At block 408, the SEN makes an authorization decision as to whether the client is authorized to access the requested resource, for example using means such as the processor 802, the memory 804, and/or the like. If the client is authorized to access the resource, the process continues to block 410. If the client is not authorized, the process ends.

At block 410, the SEN forwards the CLI request to the SRV, for example using means such as the processor 802, the memory 804, the communications interface 806, and/or the like. Optionally, at block 412, the SEN may send logs regarding the CLI requests to the UNI for use in analytics.

Figure 5:
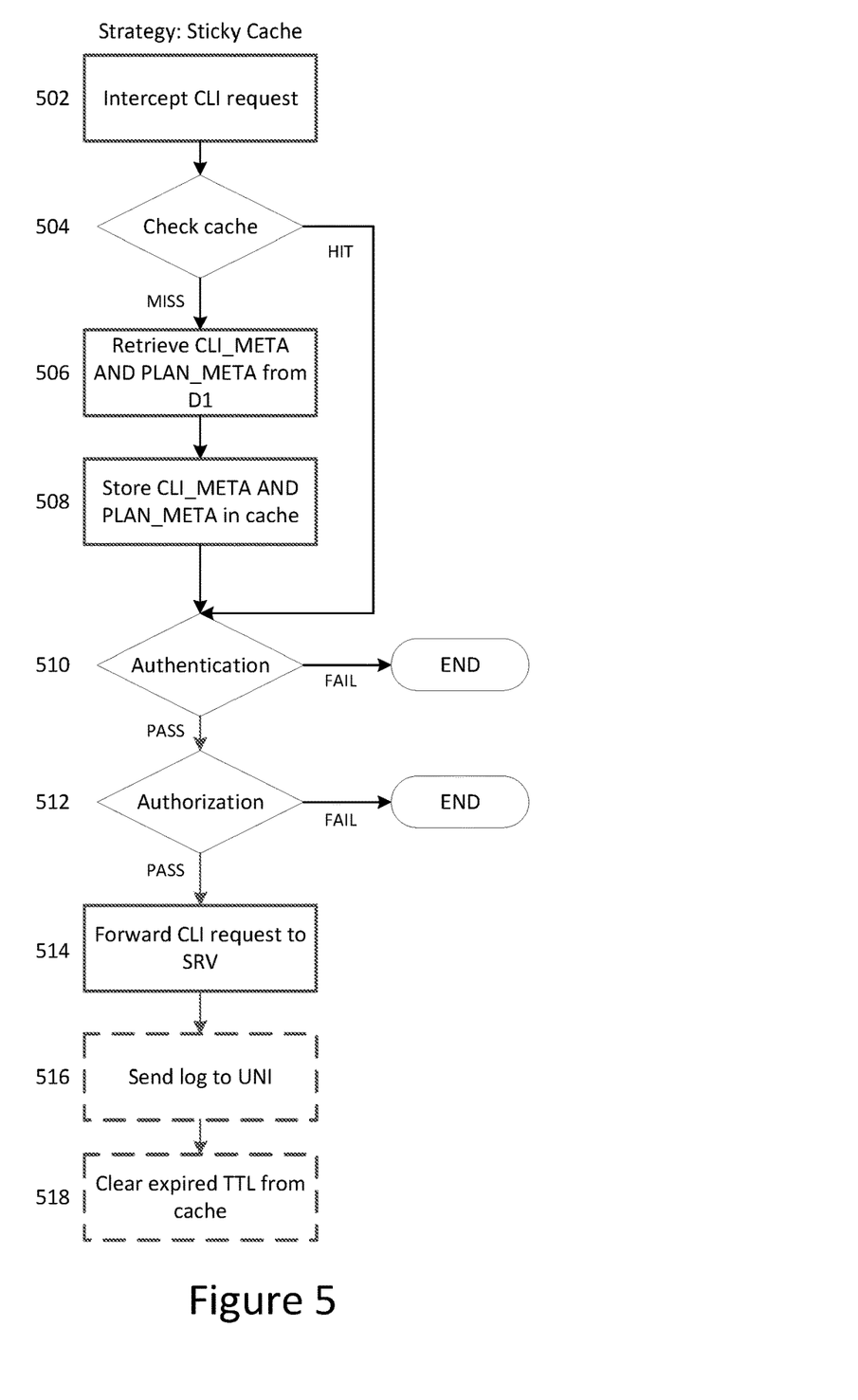
FIG. 5 provides a flow chart of example operations using a "sticky cache" approach to information retention by a SEN in accordance with an example embodiment of the present invention.

FIG. 5 provides a flow chart of example operations using a "sticky cache" approach to information retention by a SEN in accordance with an example embodiment of the present invention. At block 502, a CLI request to SRV is intercepted at the SEN, such as SEN 106, for example using means such as the processor 802, the memory 804, the communications interface 806, and/or the like. At block 504, the SEN checks its cache to determine if the relevant data is present. If the cache check results in a hit (i.e. the data is present in the SEN cache), the process continues to block 510. If the cache check results in a miss (i.e. the data is not present in the SEN cache), the process continues to block 510.

At block 506, the SEN retrieves CLI_META and PLAN_META metadata from D1. At block 508, the SEN stores the retrieved CLI_META and PLAN_META metadata.

At block 510, the SEN makes an authentication decision in regard to the client credentials for the CLI request, for example using means such as the processor 802, the memory 804, and/or the like. If the client credentials are validated, the process continues to block 512. If the client credentials are not valid, the process ends.

At block 512, the SEN makes an authorization decision as to whether the client is authorized to access the requested resource, for example using means such as the processor 802, the memory 804, and/or the like. If the client is authorized to access the resource, the process continues to block 514. If the client is not authorized, the process ends.

At block 514, the SEN forwards the CLI request to the SRV, for example using means such as the processor 802, the memory 804, the communications interface 806, and/or the like. Optionally, at block 516, the SEN may send logs regarding the CLI requests to the UNI for use in analytics. Further, in some embodiments, the SEN may clear expired data from cache (e.g., cached data with expired time-to-live (TTL) parameter values) at block 518.

Figure 6:
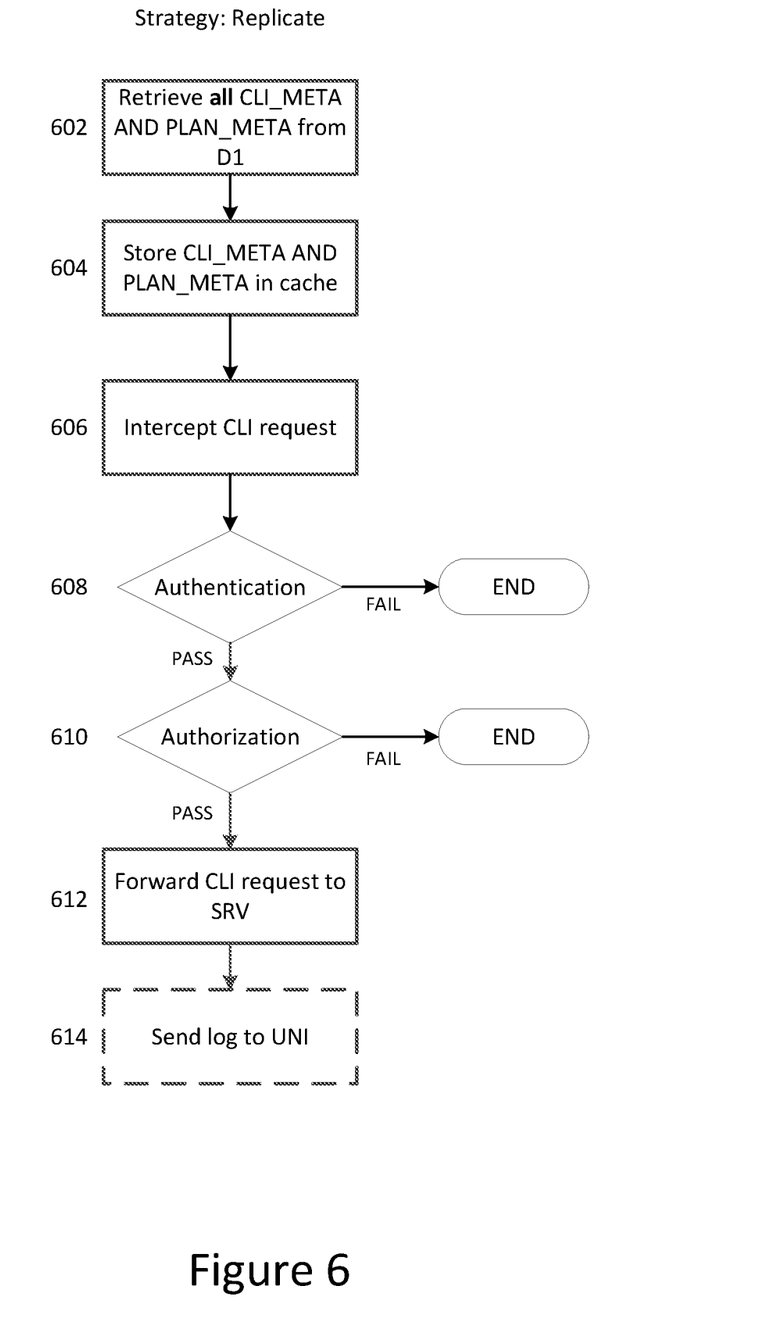
FIG. 6 provides a flow chart of example operations using a "replicate" approach to information retention by a SEN in accordance with an example embodiment of the present invention.

FIG. 6 provides a flow chart of example operations using a "replicate" approach to information retention by a SEN in accordance with an example embodiment of the present invention. At block 602, the SEN, such as SEN 106, retrieves all available CLI_META and PLAN_META metadata from D1. At block 604, the SEN stores the retrieved CLI_META and PLAN_META metadata.

At block 606, a CLI request to SRV is intercepted at the SEN, for example using means such as the processor 802, the memory 804, the communications interface 806, and/or the like.

At block 608, the SEN makes an authentication decision in regard to the client credentials for the CLI request, for example using means such as the processor 802, the memory 804, and/or the like. If the client credentials are validated, the process continues to block 610. If the client credentials are not valid, the process ends.

At block 610, the SEN makes an authorization decision as to whether the client is authorized to access the requested resource, for example using means such as the processor 802, the memory 804, and/or the like. If the client is authorized to access the resource, the process continues to block 612. If the client is not authorized, the process ends.

At block 612, the SEN forwards the CLI request to the SRV, for example using means such as the processor 802, the memory 804, the communications interface 806, and/or the like. Optionally, at block 614, the SEN may send logs regarding the CLI requests to the UNI for use in analytics.

Figure 7:
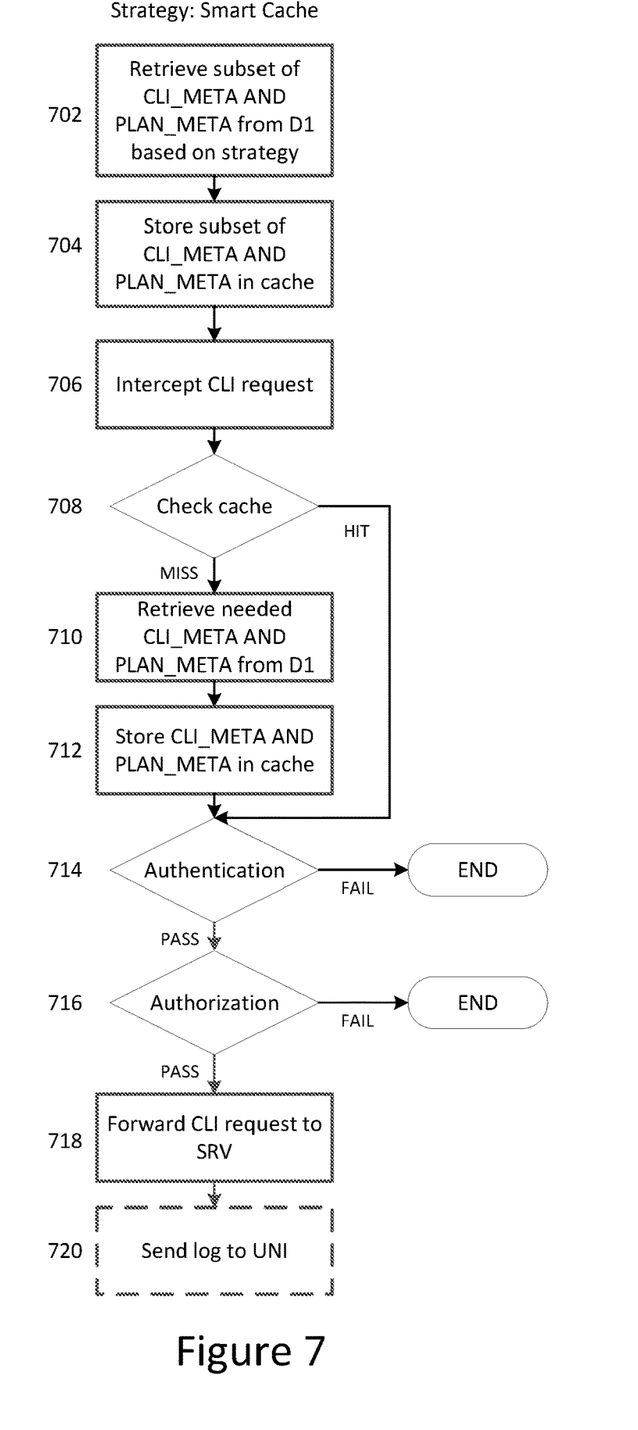
FIG. 7 provides a flow chart of example operations using a "smart cache" approach to information retention by a SEN in accordance with an example embodiment of the present invention.

FIG. 7 provides a flow chart of example operations using a "smart cache" approach to information retention by a SEN in accordance with an example embodiment of the present invention. At block 702, the SEN, such as SEN 106, retrieves a subset of available CLI_META and PLAN_META metadata from D1, for example, based on the strategy, such as for premium content. At block 704, the SEN stores the retrieved subset of CLI_META and PLAN_META metadata.

At block 706, a CLI request to SRV is intercepted at the SEN, for example using means such as the processor 802, the memory 804, the communications interface 806, and/or the like. At block 708, the SEN checks cache to determine if the relevant data is present. If the cache check results in a hit (i.e. the data is present in the SEN cache), the process continues to block 714. If the cache check results in a miss (i.e. the data is not present in the SEN cache), the process continues to block 710.

At block 710, the SEN retrieves the relevant CLI_META and PLAN_META metadata from D1. At block 712, the SEN stores the retrieved CLI_META and PLAN_META metadata.

At block 714, the SEN makes an authentication decision in regard to the client credentials for the CLI request, for example using means such as the processor 802, the memory 804, and/or the like. If the client credentials are validated, the process continues to block 716. If the client credentials are not valid, the process ends.

At block 716, the SEN makes an authorization decision as to whether the client is authorized to access the requested resource, for example using means such as the processor 802, the memory 804, and/or the like. If the client is authorized to access the resource, the process continues to block 718. If the client is not authorized, the process ends.

At block 718, the SEN forwards the CLI request to the SRV, for example using means such as the processor 802, the memory 804, the communications interface 806, and/or the like. Optionally, at block 720, the SEN may send logs regarding the CLI requests to the UNI for use in analytics. Further, in some embodiments, the SEN may clear expired data from cache (e.g., cached data with expired time-to-live (TTL) parameter values).

Figure 8:
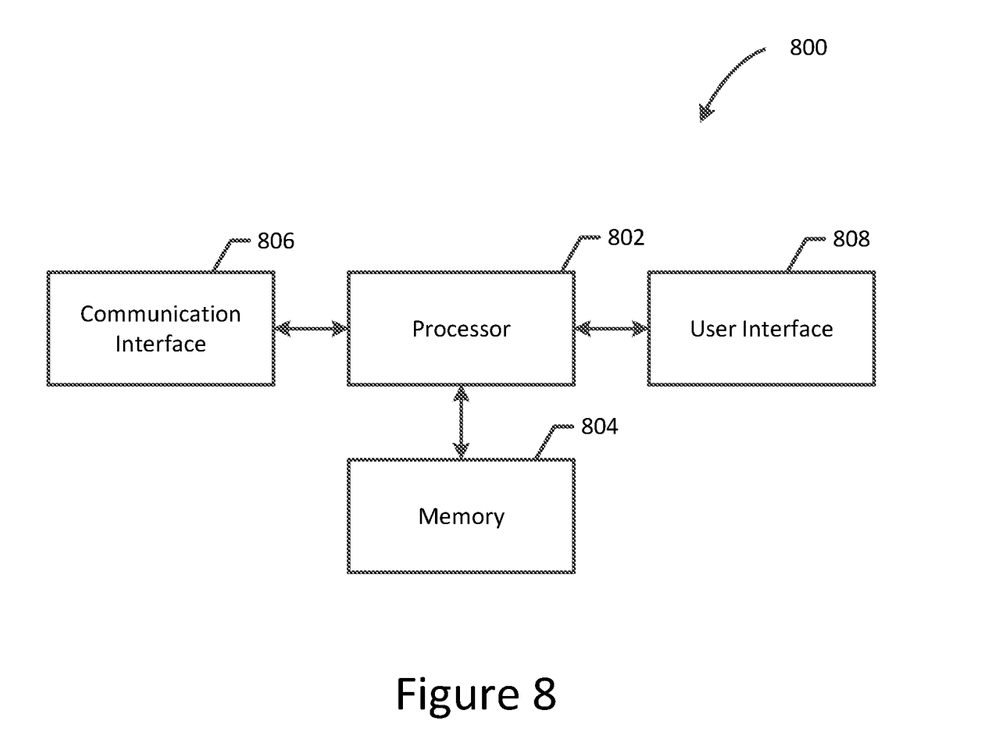
FIG. 8 illustrates a block diagram of an apparatus that may be specifically configured in accordance with an example embodiment of the present invention.

FIG. 8 illustrates an example of an apparatus 800 that may be used in embodiments of the present invention and that may perform one or more of the operations set forth by FIGS. 1-7 described above.

It should also be noted that while FIG. 8 illustrates one example of a configuration of an apparatus 800, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring to FIG. 8, the apparatus 800 in accordance with one example embodiment may include or otherwise be in communication with one or more of at least one processor 802, at least one memory 804, communication interface circuitry 806, and user interface circuitry 808.

In some embodiments, the processor 802 (and/or co-processors or any other processing circuitry assisting or otherwise associated with the processor) may be in communication with the memory 804 via a bus for passing information among components of the apparatus. The memory 804 may include, for example, a non-transitory memory, such as one or more volatile and/or non-volatile memories. In other words, for example, the memory may be an electronic storage device (e.g., a computer readable storage medium) comprising gates configured to store data (e.g., bits) that may be retrievable by a machine (e.g., a computing device like the processor). The memory may be configured to store information, data, content, applications, instructions, or the like for enabling the apparatus to carry out various functions in accordance with an example embodiment of the present invention. For example, the memory could be configured to buffer input data for processing by the processor. Additionally or alternatively, the memory could be configured to store instructions for execution by the processor.

In some embodiments, the apparatus 800 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 802 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 8302 may be configured to execute instructions stored in the memory 804 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA, or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU), and logic gates configured to support operation of the processor.

Meanwhile, the communication interface 806 may be any means such as a device or circuitry embodied in either hardware or a combination of hardware and software that is configured to receive and/or transmit data from/to a network and/or any other device or module in communication with the apparatus 800. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As such, for example, the communication interface may include a communication modem and/or other hardware/software for supporting communication via cable, digital subscriber line (DSL), universal serial bus (USB) or other mechanisms.

The apparatus 800 may include user interface 808 that may, in turn, be in communication with the processor 802 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone, and/or the like. The processor and/or user interface circuitry comprising the processor may be configured to control one or more functions of one or more user interface elements through computer program instructions (e.g., software and/or firmware) stored on a memory accessible to the processor (e.g., memory 804, and/or the like).

As described above, FIGS. 3-7 illustrate flowcharts of operations for an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 804 of an apparatus employing an embodiment of the present invention and executed by a processor 802 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the blocks with dashed outlines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   intercepting, by a processor, a client request for a service;
   retrieving metadata related to the client request based on the client request;
   causing the metadata related to the client request to be stored as cached data, wherein the cached data is periodically refreshed according to a subset of clients based upon a frequency with which the clients request a service, wherein the subset of clients based upon a frequency with which the clients request a service is periodically calculated on a per-region basis;
   performing an authentication check for the client request based on cached data after retrieving metadata related to the client request;
   in an instance in which the authentication check succeeds, performing an authorization check for the client request based on the cached data; and
   in an instance in which the authorization check succeeds, forwarding the client request for the service to the service.

2. The method of claim 1 further comprising logging data associated with the client request.

3. The method of claim 1 further comprising:
   checking a cache for data relevant to the client request;
   in an instance in which the data relevant to the client request is not found in the cache, retrieving metadata related to the client request based on the client request; and
   causing the retrieved metadata to be stored to the cache prior to performing the authentication check.

4. The method of claim 3 further comprising clearing data from the cache based on a time-to-live parameter associated with the data.

5. The method of claim 1 wherein the client request for the service comprises a client request for service by a Representational State Transfer (REST) Application Program Interface (API) endpoint.

6. The method of claim 1, wherein the subset of clients most frequently requesting a service on a per-region basis is periodically calculated on a per-service basis.

7. An apparatus comprising at least one processor and at least one memory including computer program instructions, the at least one memory and the computer program instructions, with the at least one processor, causing the apparatus at least to:

intercept a client request for a service;

retrieve metadata related to the client request based on the client request;

cause the metadata related to the client request to be stored as cached data, wherein the cached data is periodically refreshed according to a subset of clients based upon a frequency with which the clients request a service, wherein the subset of clients based upon a frequency with which the clients request a service is periodically calculated on a per-region basis;

perform an authentication check for the client request based on cached data after metadata related to the client request has been retrieved;

in an instance in which the authentication check succeeds, perform an authorization check for the client request based on the cached data; and in an instance in which the authorization check succeeds, forward the client request for the service to the service.

8. The apparatus of claim 7 wherein the at least one memory and the computer program instructions, with the at least one processor, further cause the apparatus to log data associated with the client request.

9. The apparatus of claim 7 wherein the at least one memory and the computer program instructions, with the at least one processor, further cause the apparatus to:

check a cache for data relevant to the client request;

in an instance in which the data relevant to the client request is not found in the cache, retrieve metadata related to the client request based on the client request; and cause the retrieved metadata to be stored to the cache prior to performing the authentication check.

10. The apparatus of claim 9 wherein the at least one memory and the computer program instructions, with the at least one processor, further cause the apparatus to clear data from the cache based on a time-to-live parameter associated with the data.

11. The apparatus of claim 7 wherein the client request for the service comprises a client request for service by a Representational State Transfer (REST) Application Program Interface (API) endpoint.

12. The apparatus of claim 7 wherein the apparatus is embodied by a Secure End Node (SEN).

13. A computer program product comprising at least one non-transitory computer-readable storage medium bearing computer program instructions embodied therein for use with a computer, the computer program instructions comprising program instructions which, when executed, cause the computer at least to:

intercept a client request for a service;

retrieve metadata related to the client request based on the client request;

cause the metadata related to the client request to be stored as cached data, wherein the cached data is periodically refreshed according to a subset of clients based upon a frequency with which the clients request a service, wherein the subset of clients based upon a frequency with which the clients request a service is periodically calculated on a per-region basis;

perform an authentication check for the client request based on cached data after metadata related to the client request has been retrieved;

in an instance in which the authentication check succeeds, perform an authorization check for the client request based on the cached data; and in an instance in which the authorization check succeeds, forward the client request for the service to the service.

14. The computer program product of claim 13 wherein the computer program instructions further comprise program instructions which, when executed, cause the computer to log data associated with the client request.

15. The computer program product of claim 13 wherein the computer program instructions further comprise program instructions which, when executed, cause the computer to:

check a cache for data relevant to the client request;

in an instance in which the data relevant to the client request is not found in the cache, retrieve metadata related to the client request based on the client request; and cause the retrieved metadata to be stored to the cache prior to performing the authentication check.

16. The computer program product of claim 15 wherein the computer program instructions further comprise program instructions which, when executed, cause the computer to clear data from the cache based on a time-to-live parameter associated with the data.

17. The computer program product of claim 13 wherein the client request for the service comprises a client request for service by a Representational State Transfer (REST) Application Program Interface (API) endpoint.

* * * * *